US010051430B2

(12) United States Patent
Bessho

(10) Patent No.: US 10,051,430 B2
(45) Date of Patent: Aug. 14, 2018

(54) DETERMINATION DEVICE THROUGH CLUSTERING ANALYSIS OF POSITION HISTORY DATA, METHOD, AND NON-TRANSITORY COMPUTER READABLE STORAGE MEDIUM

(71) Applicant: YAHOO JAPAN CORPORATION, Tokyo (JP)

(72) Inventor: Naoya Bessho, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/429,608

(22) Filed: Feb. 10, 2017

(65) Prior Publication Data
US 2017/0245114 A1    Aug. 24, 2017

(30) Foreign Application Priority Data

Feb. 19, 2016 (JP) .................................. 2016-030495

(51) Int. Cl.
| | | |
|---|---|---|
| *H04W 4/029* | (2018.01) | |
| *G06Q 10/08* | (2012.01) | |
| *H04W 4/02* | (2018.01) | |

(52) U.S. Cl.
CPC ...... *H04W 4/029* (2018.02); *G06Q 10/08355* (2013.01); *H04W 4/028* (2013.01)

(58) Field of Classification Search
CPC ..... H04W 4/025; H04W 4/026; H04W 4/027; H04W 4/028; H04W 4/04; H04W 64/00;
(Continued)

(56) References Cited

U.S. PATENT DOCUMENTS 8,412,234 B1    4/2013  Gatmir-Motahari et al.
9,656,805 B1 *  5/2017  Evans ................... B65G 1/1373
(Continued)

FOREIGN PATENT DOCUMENTS

JP    2002-255351 A    9/2002
JP    2012-146018 A    8/2012
(Continued)

OTHER PUBLICATIONS

May 9, 2017 Office Action issued in Japanese Patent Application No. 2016-030495.
(Continued)

*Primary Examiner* — Jean Gelin
(74) *Attorney, Agent, or Firm* — Oliff PLC

(57) ABSTRACT

According to an embodiment a determination device through a clustering analysis of position history data incudes an estimation unit that, by conducting a clustering analysis on history data of pieces of geographical position information on Earth of a plurality of movable bodies that is obtained by a positioning device, based, on a horizontal position constituted of a latitude and a longitude and a lapse of time, acquires pieces of area information indicating a characteristic of geographical area in which there is a tendency for the movable bodies to be positioned, the history data being accumulated sequentially in a storage device with pieces of movable body identification information and pieces of timestamp information, and a determination unit that determines whether the movable body is present in a specified point in time and the geographical area, based on the pieces of area information acquired for one of the movable bodies.

20 Claims, 8 Drawing Sheets

(58) Field of Classification Search
CPC . H04W 60/04; H04W 64/003; H04W 64/006; H04W 4/029
See application file for complete search history.

(56) References Cited

U.S. PATENT DOCUMENTS

| | | | |
|---|---|---|---|
| 2010/0169004 A1* | 7/2010 | Ono | G01C 21/3679 |
| | | | 701/408 |
| 2011/0137907 A1* | 6/2011 | Ikenoue | G06F 17/30241 |
| | | | 707/740 |
| 2012/0253667 A1* | 10/2012 | Sakazaki | G01C 21/206 |
| | | | 701/461 |
| 2016/0011002 A1 | 1/2016 | Amano et al. | |
| 2016/0321604 A1* | 11/2016 | Imaeda | G06Q 10/0833 |
| 2016/0379164 A1* | 12/2016 | Li | G06Q 10/0833 |
| | | | 705/333 |
| 2017/0245114 A1 | 8/2017 | Bessho | |

FOREIGN PATENT DOCUMENTS

| | | |
|---|---|---|
| JP | 2012-252619 A | 12/2012 |
| JP | 2013-167972 A | 8/2013 |
| JP | 2015-122055 A | 7/2015 |
| JP | 2015-149079 A | 8/2015 |
| WO | 2015/068665 A1 | 5/2015 |

OTHER PUBLICATIONS

Suzuki et al., "Correlation Between Vendor Information from Wireles LAN AP Around Users and Time Periods", pp. 1-8, 2016.
Nov. 29, 2016 Office Action issued in Japanese Patent Application No. 2016-030495.
Jun. 25, 2018 Office Action issued in U.S. Appl. No. 15/872,464.

\* cited by examiner

FIG.3

| TERMINAL ID | USER ID | POSITION INFORMATION | COLLECTION TIME | TERMINAL INFORMATION | COMMUNICATION DEVICE INFORMATION | ... |
|---|---|---|---|---|---|---|
| ID101 | U01 | POSITION #1 | 2015/01/01/ 21:00:00 | TERMINAL INFORMATION #1 | COMMUNICATION DEVICE #1 | ... |
| ID102 | U02 | POSITION #1 | 2015/01/01/ 21:00:10 | TERMINAL INFORMATION #2 | COMMUNICATION DEVICE #1 | ... |
| ID103 | U03 | POSITION #3 | 2015/01/01/ 22:00:20 | TERMINAL INFORMATION #3 | COMMUNICATION DEVICE #2 | ... |
| ID102 | U02 | POSITION #1 | 2015/01/01/ 22:25:25 | TERMINAL INFORMATION #2 | COMMUNICATION DEVICE #1 | ... |
| ID104 | U04 | POSITION #1 | 2015/01/03/ 21:25:00 | TERMINAL INFORMATION #4 | COMMUNICATION DEVICE #3 | ... |
| ID101 | U01 | POSITION #2 | 2015/01/5/ 10:00:05 | TERMINAL INFORMATION #1 | COMMUNICATION DEVICE #4 | ... |
| ⋮ | ⋮ | ⋮ | ⋮ | ⋮ | ⋮ | ⋮ |

FIG.4

| BASE ID | POSITION INFORMATION | TERMINAL ID | USER ID | ROOM NUMBER | ... |
|---|---|---|---|---|---|
| BASE #1 | POSITION #1 | ID101, ID102 | U01, U02 | R21 | ... |
| BASE #2 | POSITION #1 | ID103 | U03 | R11 | ... |
| BASE #3 | POSITION #1 | ID104 | U04 | R12 | ... |
| ⋮ | ⋮ | ⋮ | ⋮ | ⋮ | ⋮ |

FIG.5

| BASE ID | 10:00 TO 11:00 | 11:00 TO 12:00 | ... |
|---|---|---|---|
| BASE #1 | 70 % | 80 % | ... |
| BASE #2 | 80 % | 20 % | ... |
| BASE #3 | 10 % | 10 % | ... |
| ⋮ | ⋮ | ⋮ | ⋮ |

FIG.8

| DELIVERER ID | PACKAGE ID | DELIVERY DESTINATION ID | ... |
|---|---|---|---|
| V01 | PACKAGE #1 | BASE #1 | ... |
| | PACKAGE #2 | BASE #2 | ... |
| | PACKAGE #3 | BASE #3 | ... |
| | ⋮ | ⋮ | ⋮ |

FIG.9

START
↓
S201: DETERMINATION RESULT AND PIECES OF PRESENCE PROBABILITY INFORMATION ARE ACQUIRED
↓
S202: PIECES OF PRESENCE PROBABILITY INFORMATION ARE REGISTERED
↓
S203: DELIVERY ROUTE IS GENERATED BASED ON PROBABILITIES OF PRESENCE OF USERS IN BASES AS DELIVERY DESTINATIONS OF PACKAGES
↓
S204: DELIVERY ROUTE TOGETHER WITH DETERMINATION RESULT IS TRANSMITTED TO VISITOR TERMINAL
↓
END

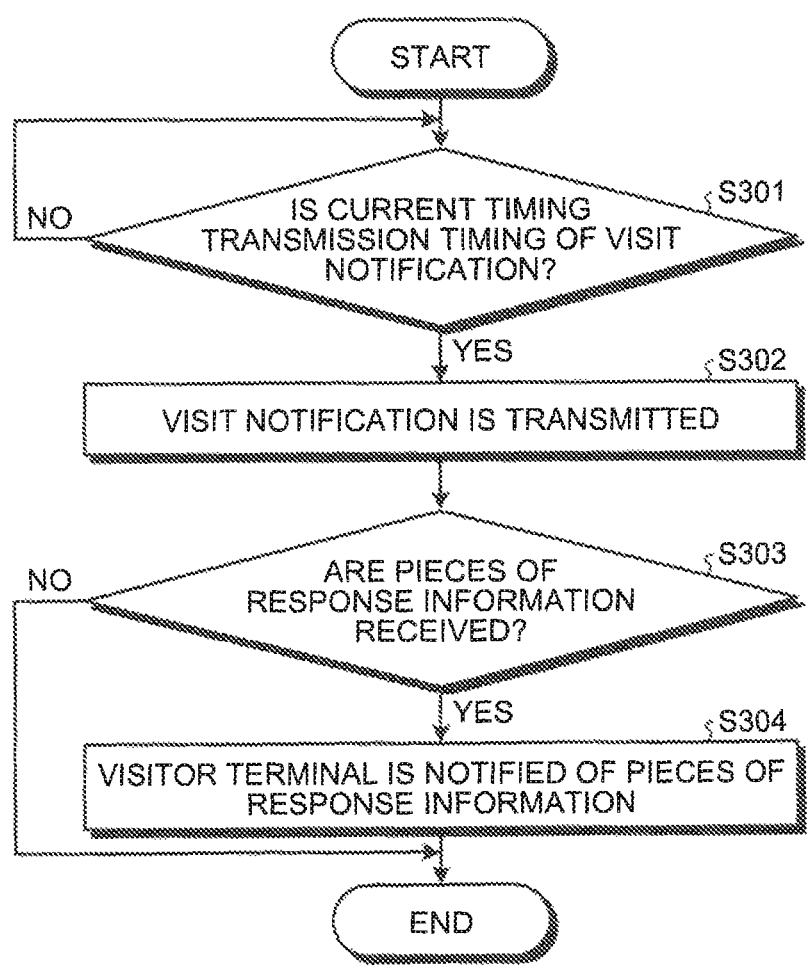

DETERMINATION DEVICE THROUGH CLUSTERING ANALYSIS OF POSITION HISTORY DATA, METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2016-030495 filed in Japan on Feb. 19, 2016.

BACKGROUND OF THE INVENTION

1. Field of the Invention

The present invention relates to a determination device through a clustering analysis of position history data, a method, and a non-transitory computer readable storage medium.

2. Description of the Related Art

Conventionally, delivery business of collecting packages from delivery sources and delivering the collected packages to specified delivery destinations has been known. The delivery business has a problem in terms of profitability because when the package is delivered to the specified delivery destination and a user receiving the package is absent, the package needs to be delivered again after a while. In order to solve the problem, following technique has been proposed. That is, a small base station is installed in a house, and when a previously registered terminal device of a user is present in a communication area of the small base station, it is determined that the user is present at a delivery destination and a package is delivered thereto.

Japanese Patent Application Laid-open No. 2012-252619.

With the above-mentioned conventional technique, it cannot however be considered that absence of the user is capable of being easily determined, resulting in a problem.

The above-mentioned conventional technique, for example, requires time and effort for advance preparation, at the delivery destination involving installation of dedicated equipment such as the small base station in the house and previous registration of the terminal device of the user.

SUMMARY OF THE INVENTION

It is an object of the present invention to at least partially solve the problems in the conventional technology.

According to one aspect of an embodiment a determination device through a clustering analysis of position history data incudes an estimation unit that, by conducting a clustering analysis on history data of pieces of geographical position information on Earth of a plurality of movable bodies that is obtained by a positioning device, based on a horizontal position constituted of a latitude and a longitude and a lapse of time, acquires pieces of area information indicating a characteristic of geographical area in which there is a tendency for the movable bodies to be positioned, by controlling an electronic information processing unit, the history data being accumulated sequentially in a storage device with pieces of movable body identification information and pieces of timestamp information. The determination device through a clustering analysis of position history data includes a determination unit that determines whether the movable body is present in a specified point in time and the geographical area, based on the pieces of area information acquired for one of the movable bodies, by controlling an electronic information processing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of pieces of information that are registered in a position history database in the embodiment;

FIG. 4 is a diagram illustrating an example of pieces of information that are registered in an estimation result database in the embodiment;

FIG. 5 is a diagram illustrating an example of pieces of information that are registered in a presence probability database in the embodiment;

FIG. 8 is a diagram illustrating an example of pieces of information that are registered in a delivery database in the embodiment;

FIG. 9 is a flowchart for explaining an example of flow of generation processing that the delivery center server executes in the embodiment; and FIG. 10 is a flowchart for explaining an example of flow of transmission processing that the delivers center server executes in the embodiment.

DETAILED DESCRIPTION OF THE PREFERRED EMBODIMENTS

Figure 1:
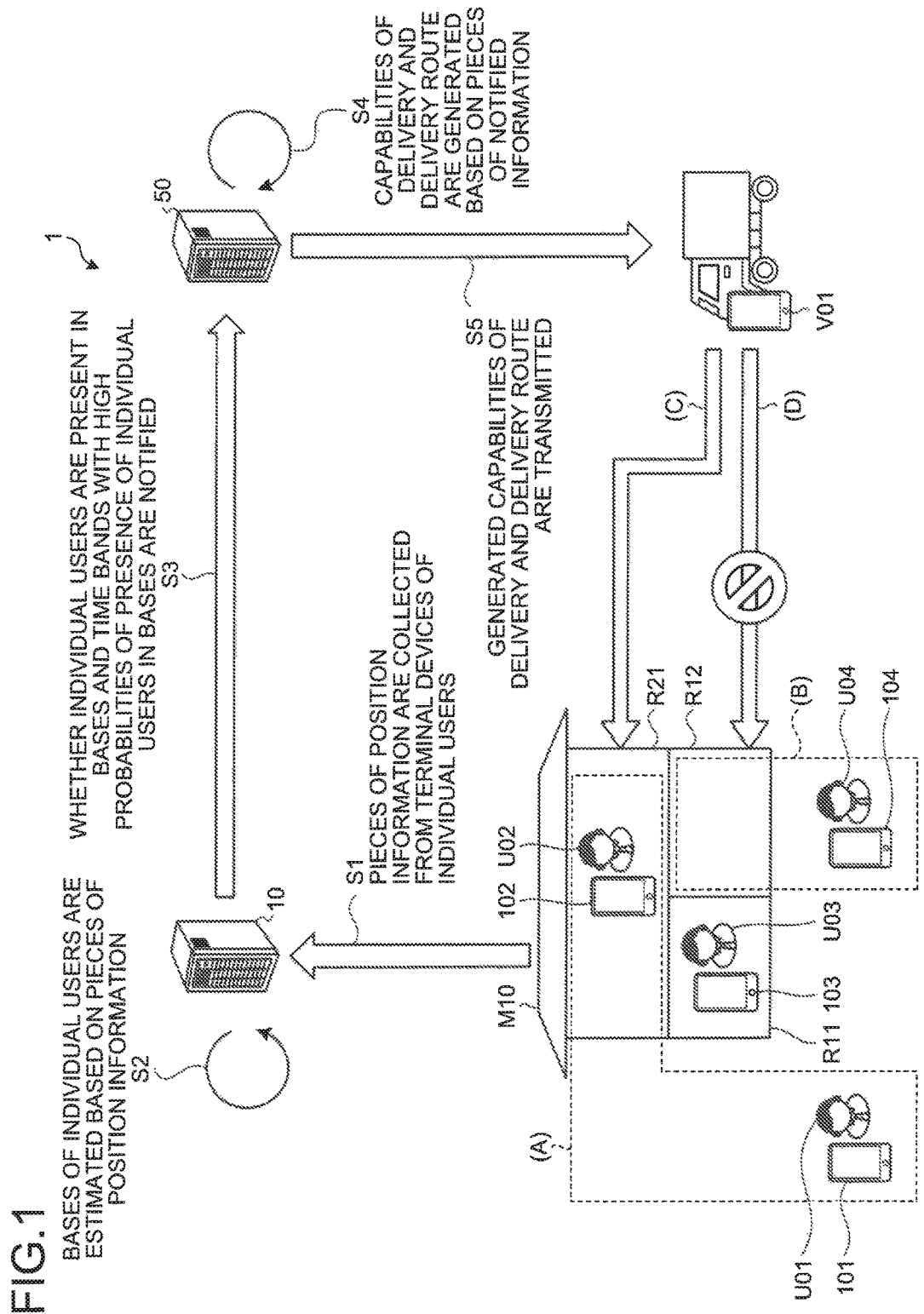
FIG. 1 is a diagram for explaining an example of action effects exerted by a determination system according to an embodiment.

Modes (hereinafter, referred to as "embodiments") for carrying out a determination device through a clustering analysis of position history data, a method, and a non transitory computer readable storage medium according to the present application will be described in detail below with reference to the drawings. It should be noted that the embodiments do not limit the determination device through a clustering analysis of position history data, the method, and the non-transitory computer readable storage medium in the present application. The same reference numerals denote the same sites and the same pieces of processing in the following embodiments and overlapped description thereof is omitted.

The following describes an example of a determination system providing a delivery service of delivering packages to specified bases using an estimation result by, as processing executed by the determination device, estimating bases of users U01 to U04 based on histories of positions of terminal devices 101 to 104 used by the users U01 to U04, respectively.

1. Outline of Determination System

First, concepts of estimation processing and determination processing that a determination system 1 executes will be described with reference to FIG. 1. FIG. 1 is a diagram for explaining an example of action effects exerted by the determination system in the embodiment. In the example illustrated in FIG. 1, the determination system 1 includes a determination server 10, a delivery center server 50, the terminal devices 101 to 104, and a visitor terminal V01.

In the following description, the terminal devices 101 to 104 are collectively referred tea as terminal devices 100 in cases. The outline illustrated in FIG. 1 is merely an example and the determination system 1 may include th desired number of terminal devices 100, the desired number of determination servers 10, the desired number of delivery center servers 50, and the desired number of visitor terminals V01.

Each terminal device 100 is a terminal device such as a mobile terminal like a smart phone, a tablet terminal, and a personal digital assistant (PDA), and a notebook-type personal computer (PC), and is capable of communicating with any server through a network such as a mobile communication network, the Internet, and a wireless local area network (LAN). The terminal device 100 has a positioning function of specifying the position (hereinafter, referred as "current position") of the terminal device 100 at a predetermined time interval using a positioning means such as a global positioning system (GPS).

The determination server 10 is an information processing device that executes the estimation processing, the determination processing, and decision processing, which will be described later, and is implemented by a server device, a cloud system, or the like. The determination server 10 is connected to the delivery center server 50 in a communicable manner through a network N.

The delivery center server 50 is an information processing device that executes various pieces of information processing for providing the delivery service, and is implemented by a server device, a cloud system, or the like. The delivery center server 50 is connected to the determination server 10 and the visitor terminal V01 in a communicable manner through the network N.

The visitor terminal V01 is a terminal device such as a mobile terminal like a smart phone, a tablet terminal, and a PDA, and a notebook-type PC, and is capable of communicating with the delivery center server 50 through the network N such as a mobile communication network, the Internet, and a wireless local area network (LAN). The visitor terminal. V01, for example, displays various pieces of information about the delivery service such as capabilities of visits to bases as delivery destinations and a delivery route in accordance with instructions from the delivery center server 50.

The users U01 to U04 are, for example, users using the terminal devices 101 to 104, respectively, and living in the same multiple dwelling housing (e.g. apartment house) M10. To be more specific, the user U01 using the terminal device 101 and the user U02 using the terminal device 102 are the users living in a room (meaning a dwelling unit or a house, the same holds true hereinbelow) R21 in the multiple dwelling housing M10. The user U03 using the terminal device 103 is a user living in a room Rll in the multiple dwelling housing M10 and the user U04 using the terminal device 104 is a user living in a room R12 in the multiple dwelling housing M10. That is, the users U01 to U04 are the users based in the rooms R11 to R21 located at substantially the same position.

As illustrated in (A) in FIG. 1, the user U01 is currently out whereas the user U02 stays in the room R21. The user U02 can therefore receive a package addressed to the user U01 or the user U02, that is, a package addressed to the room R21. Accordingly, the package can be delivered to the room R21. As illustrated in (B) in FIG. 1, the user U04 is currently out and there is therefore no user who receives a package in the room R12. Accordingly, a package addressed to the user U04, that is, a package addressed to the room R12 cannot be delivered. When a visitor visits the room R12, redelivery needs to be performed.

Advance preparation at the delivery destinations involving installation of pieces of dedicated equipment in the houses or previous registration of the terminal devices of the users in order to reduce time and effort for the redelivery requires time and effort. Furthermore, whether a user who has not performed the advance preparation is at home cannot determined.

For example, even when the terminal device 101 is located in the vicinity of the multiple dwelling housing M10, pieces of information about whether the user U01 using the terminal device 101 is based in (lives in) the multiple dwelling housing M10 and about a room in which the user U01 lives in the multiple dwelling housing M10 are not known. In other words, even when the current position of each terminal device 100 can be specified, whether a user receiving a package is present at a destination, that is, whether the package can be delivered cannot be determined in the case in which the terminal device 100 corresponding to a base as the destination of the package is unknown. Moreover, even when the user receiving the package is present in the base as the destination of the package, whether the user is a real user based in the destination cannot be checked. There is therefore a risk that the package is delivered to a malicious third party.

In order to address the above-mentioned situations, the determination system 1 determines whether the individual users U01 to U04 are at home, that is, whether the packages addressed to the individual bases can be delivered without requiring the advance preparation by executing various pieces of processing, which will be described below.

First, the terminal devices 100 position the current positions of the terminal devices 100 using the positioning means such as the GPS. The determination server 10 collects pieces of position information indicating the current positions from the terminal devices 100 of the individual users U01 to U04 (step S1). The terminal devices 100 may transmit the pieces of position information to the determination server 10 with, for example, a function of a previously installed predetermined application or the like.

The determination server 10 executes the estimation processing of estimating bases such as houses and work places of the individual users U01 to U04 by estimating correspondence between the terminal devices 100 and the bases based on the pieces of position information collected from the terminal devices 100 (step S2). The determination server 10 executes the determination processing of determining whether the users U01 to U04 using the terminal devices 100 corresponding to the bases as visit destinations are present in the bases based on the estimation result, executes specification processing of specifying time bands with probabilities of presence of the individual users U01 to U04 in the estimated bases, in which the probabilities are higher than a predetermined threshold, and notifies the delivery center server 50 of results of the individual pieces of processing (step S3).

The delivery center server 50 executes generation processing of generating capabilities of visits to the bases as the delivery destinations (that is, capabilities of delivery of the packages) and a delivery route as route for delivering the packages to the bases based on the notified pieces of information (step S4). Then, the delivery center server 50 transmits the generated capabilities of delivery and delivery route to the visitor terminal V01 (step S5).

2. Estimation Processing and Determination Processing that Determination Server 10 Executes in the Embodiment Hereinafter, examples of the functional configuration and action effects of the determination server 10 that executes the above-mentioned estimation processing and determination processing will be described with reference to the drawings.

2-1. Example of Functional Configuration

Figure 2:
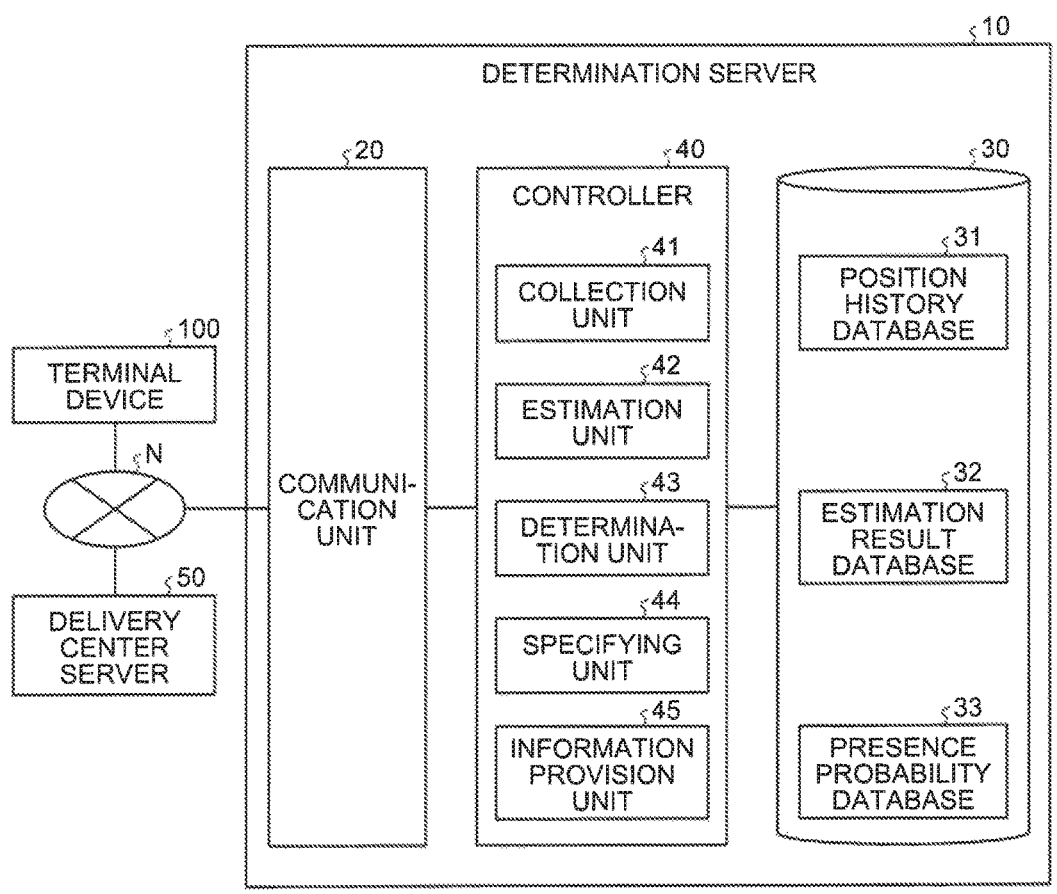
FIG. 2 is a diagram for explaining an example of the functional configuration of a determination server in the embodiment.

FIG. 2 is a diagram for explaining the example of the functional configuration of the determination server in the embodiment. As illustrated in FIG. 2, the determination server 10 includes a communication unit 20, a storage unit 30, and a controller 40. The communication unit 20 is implemented by, for example, a network interface card (NIC). The communication unit 20 is connected to the network N by wire or wirelessly and transmits and receives pieces of information between the determination server 10 and the delivery center server 50 and the terminal device 100.

The storage unit 30 is implemented by, for example, a semiconductor memory element such as a random access memory (RAM) and a flash memory or a storage device such as a hard disk and an optical disk. The storage unit 30 includes a position history database 31, an estimation result database 32, and a presence probability database 33.

Pieces of position history information indicating histories of positions at which the terminal devices 100 have stayed are registered in the position history database 31. To be more specific, the pieces of position information collected from the terminal devices 100 are registered as the pieces of position history information in the position history database 31.

FIG. 3 is a diagram illustrating an example of pieces of information that are registered in the position history database in the embodiment. In the example illustrated in FIG. 3, the pieces of position history information having items of a "terminal identifier (ID)", a "user ID", "position information", "collection time", "terminal information", and "communication device information" are registered in the position history database 31. It should be noted that pieces of position history information having a desired item other than the items illustrated in FIG. 3 may be registered in the position history database 31.

The "terminal ID" is an identifier indicating the terminal device 100 that has acquired the corresponding position information using the positioning function such as the GPS. The "user ID" is an identifier indicating the user using the terminal device 100 indicated by the corresponding "terminal ID". The "position information" is information indicating the position of the terminal device 100, the position being measured by the terminal device 100 indicated by the corresponding "terminal ID". The "collection time" is the time at which the corresponding "position information" has been measured or the time at which the corresponding "position information" has been collected from the terminal device 100.

The "terminal information" is information about the terminal device 100 indicated by the corresponding "terminal ID". The "terminal information" is, for example, a model name and a model number of the terminal device 100, and an Internet protocol (IP) address and a media access control (MAC) address assigned to the terminal device 100. The "terminal information" is, for example, information indicating names and versions of an operating system (OS), an application (for example, a disaster prevention prompt report application or a map application) that has collected the corresponding "position information", an application that has transmitted the "position information" to the determination server 10, and the like. That is, as the "terminal information", any information indicating characteristics of the terminal device 100 indicated by the corresponding "terminal ID" can be employed.

The "communication device information" is information indicating a communication device (for example, a wireless LAN master unit, also referred to as a wireless router or the like) with which the terminal device 100 indicated by the corresponding "terminal ID" can communicate or a communication device used when the position information is transmitted to the determination server 10. The "communication device information" is, for example, information about characteristics containing specifications and a format of communication that are generated in communication between the terminal device 100 and the communication device. The terminal device 100 acquires the "communication device information" from the communication device or a collection unit 41 of the determination server 10 acquires the "communication device information" through the communication unit 20. The communication device information is, for example, a device name, a model number, Internet protocol (IP) address, a port number, and a service set identifier (SSID) of the communication device. As a more specific example, the "communication device information" is various pieces of information about an access point installed at a base, such as the communication device with which the terminal device 100 indicated by the corresponding "terminal ID" can communicate In the example illustrated in FIG. 3, for example, the position history information in which a terminal ID "ID101", a user ID "U01", position information "position #1", collection time "2015/01/01/21:00:00", terminal information "terminal information #1", and communication device information "communication device #1" correspond to one another is registered in the position history database 31. This position history information indicates, for example, that the user U01 indicated by the user ID "U01" uses the terminal device 101 indicated by the terminal ID "IDIOT". The position history information further indicates that the terminal device 101 has collected the position information "position #1" at the collection time "2015/01/01/21:00:00". In addition, the position history information indicates that the terminal information of the terminal device 101 is the "terminal information #1" and that the communication device information of the communication device installed at a position communicable with the terminal device 101 is the communication device information "communication device #1". When the terminal device 101 transmits the position information and the like to the determination server 10 through the communication device, the communication device information is the IP address and the like of the communication device that has transferred the position information transmitted from the terminal device 101 to the determination server 10.

Although the example in FIG. 3 illustrates conceptual values such as the "position #1", the "terminal information #1", and the "communication device #1", the embodiment is not limited thereto. In the position history database 31, for example, values of the north latitude and the east longitude, the latitude and the longitude, or the like measured by the GPS are registered as the "position information", the model name and the model number of the terminal device 100, the name and the version of the OS, and the like are registered as the "terminal information", and the IP address of the communication device, the SSID that the communication device uses, and the like are registered as the "communication device information". It should be noted that among the items illustrated in FIG. 3, information of an item that the determination server 10 have failed to collect does not have to be registered.

The estimation result by the estimation processing, which will be described later, is registered in the estimation result database 32. To be more specific, pieces of estimation result information indicating estimated correspondence between the terminal devices 100 and the bases are registered in the estimation result database 32. FIG. 4 is a diagram illustrating an example of pieces of information that are registered in the estimation result database in the embodiment. In the example illustrated in FIG. 4, the pieces of estimation result information having items of a "base ID", "position info ion", a "terminal ID", a "user ID", and a "room number" are registered in the estimation result database 32. It should be noted that pieces of estimation result information having a desired item other than the items illustrated in FIG. 4 may be registered in the estimation result database 32.

The "base ID" is an identifier for identifying a place as a hub of activity of a user, that is, a place as a base. The base may be, for example, not only a house in which the user lives but also a predetermined facility such as a work place, a temporary housing, and a park as long as it is a place that the user periodically visits. The base may be a predetermined spot that actually exists, such as a reception desk of a predetermined work place and a guardhouse of a building, as long as the position thereof can be specified. That is, the base can be any spot as long as a visitor can meet the user at the spot or the spot serves as a unit of a visit in a service involving visiting.

In the example illustrated in FIG. 4, the rooms in which the individual users live are employed as an example of the bases. The "room number" illustrated in FIG. 4 is, for example, information indicating a number of the room as the base of the user indicated by the corresponding "user ID" in the facility located at a position indicated by the corresponding "position information".

In the example illustrated in FIG. 4, for example, the estimation result information in which a base ID "base #1", position information "position #1", terminal IDs "ID101, ID102", user IDs "U01, U02", and a room number "R21" correspond to one another is registered in the estimation result database 32 This estimation result information indicates that the base indicated by the base ID "base #1" is a room indicated by the room number "R21" among the rooms in the facility located at the position information "position #1" and the users U01 and U02 using the terminal devices 101 and 102 indicated by the terminal IDs "ID101, ID102" are based in the room.

Pieces of presence probability information indicating presence probabilities specified by the specification processing, which will be described later, are registered in the presence probability database 33. To be more specific, the pieces of presence probability information indicating the probabilities of presence of the users in the bases for each time band are registered in the presence probability database 33. For example, FIG. 5 is a diagram illustrating an example of pieces of information that are registered in the presence probability database in the embodiment. In the example illustrated in FIG. 5, the presence probability information in which the "base ID" and the probabilities of the presence of the users in each base for each time band correspond to each other are registered in the presence probability database 33.

In the example illustrated in FIG. 5, for example, in the presence probability database 33, a probability "70%" of the presence of the user in the base indicated by the base ID "base #1" between "10:00 and 11:00" and a probability "80%" of the presence of the user in the base between "11:00 and 12:00" are registered. Furthermore, in the presence probability database 33, a probability "80%;" of the presence of the user in the base indicated by the base ID "base #2" between "10:00 and 11:00" and a probability "20%" of the presence of the user in the base between "11:00 and 12:00" are registered.

Description is continued with reference to FIG. 2 again. The controller 40 is implemented by, for example, causing a central processing unit (CPU), a micro processing unit (MPU), an application specific integrated circuit (ASIC), a field programmable gate array (FPGA), or the like to execute various programs stored in the storage device in the determination server 10 using a storage region of the RAM or the like as a work region. In the example illustrated in FIG. 2, the controller 40 includes the collection unit 41, an estimation unit 42, a determination unit 43, a specifying unit 44, and an information provision unit 45.

A connection relation among the processors 41 to 45 included in the controller 40 is not limited to the connection relation illustrated in FIG. 2 and may be another connection relation. The individual processors 41 to 45 implement and execute functions and actions (for example, FIG. 1) of the estimation processing and the determination processing, which will be described below, but these are functional units structured for description and may be unidentical to practical hardware components or software modules. That is, the determination server 10 may implement and execute the estimation processing and the determination processing by any functional unit as long as it can implement and execute the functions and actions of the estimation processing and the determination processing, which will be described later.

2.2. Example of Action Effects in Guide Processing

Figure 6:
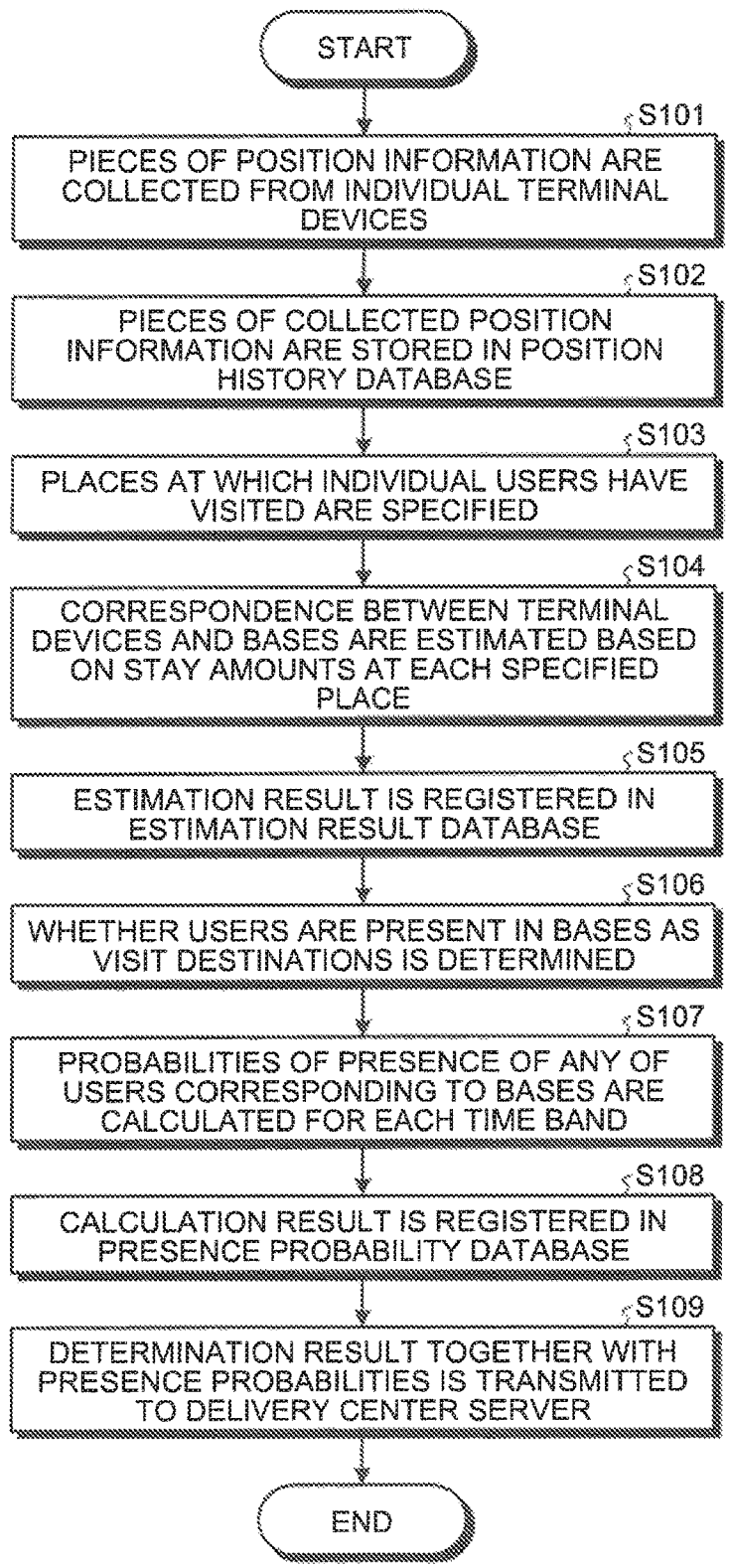
FIG. 6 is a flowchart for explaining an example of flow of guide processing that the determination server executes in the embodiment.

Hereinafter, contents of guide processing that the individual processors 41 to 45 execute and implement will be described with reference to a flowchart illustrated in FIG. 6. FIG. 6 is a flowchart for explaining an example of flow of the guide processing that the determination server executes in the embodiment.

First, the collection unit 41 collects the pieces of position information from the respective terminal devices 101 to 104 (step S101). The terminal devices 100 acquire the pieces of position information at a predetermined time interval, for example. As will be seen in the following description, the terminal devices 100 collect various pieces of information that can be indicators for estimating the bases in addition to the pieces of position information. The terminal devices 100 acquire, for example, the pieces of communication device information of the communication devices with which to urinal devices 100 communicate at the bases, such as the SSIDs of the wireless routers installed in the houses. The terminal devices 100 acquire the user IDs of the users using the terminal devices 100 through, for example, user authentication in a predetermined web service or application. Then, the terminal devices 100 transmit, to the determination server 10, the terminal IDs of the terminal devices 100, the user IDs of the users using the terminal devices 100, the pieces of acquired position information, the date and time at which the pieces of position information have been acquired, the pieces of acquired communication device information, and the pieces of terminal information indicating the OSs, browsers, and the like of the terminal devices 100. As a result, the collection unit 41 stores the various pieces of acquired information as the pieces of position history information in the position history database 31 (step S102).

The collection unit 41 may collect pieces of information other than the pieces of position information by any method. When the collection unit 41 has acquired the pieces of position information from the terminal devices 100, the collection unit 41, for example, may collect the terminal IDs and the user IDs of the users using the terminal devices 100 from servers or the like providing mobile communication network services to the terminal devices 100 utilizing, as keys, pieces of identification information such as the IP addresses corresponding to the terminal devices 100 as transmission sources of the pieces of position information by lending, address translation, or the like, and the MAC addresses that the terminal devices 100 use. The collection unit 41, for example, may collect the user IDs of the users who log-in through the terminal devices 100 from reception servers receiving the log-ins of the users for providing predetermined web services or the like.

The collection unit 41 may collect the pieces of terminal information and the pieces of communication device information from various pieces of information that can be acquired when the collection unit 4 receives the pieces of position information from the terminal devices 100. The collection unit 41 may acquire, as the pieces of terminal information, for example, the names and versions a of the assigned OSs when the terminal devices 100 transmit the pieces of information. The collection unit 41 can acquire the IP addresses and the port numbers of the communication devices as the IP addresses and the port numbers of the transmission sources of the pieces of position information when the pieces of position information are transmitted through the communication devices installed at the bases. The collection unit 41 may collect the IP addresses and the port numbers of the transmission sources of the pieces of position information as the pieces of communication device information.

Thereafter, the estimation unit 42 specifies places that the individual users have visited from the pieces of position history information registered in the position history database 31 (step S103). To be more specific, the estimation unit 42 specifies all the places at which the individual terminal devices 100 have stayed by extracting all pairs of the terminal IDs and the pieces of position information that are registered in the position history database 31 in the corresponding manner. The estimation unit 42 estimates the correspondence between the respective terminal devices 100 and the bases based on the amounts (hereinafter, referred to as stay amounts) for which the terminal devices 100 have stayed at the respective places (step S104). To be more specific, the estimation unit 42 specifies the places as the bases of the users using the terminal devices 100 based on the stay amounts of the terminal devices 100 and causes the specified places to correspond to the terminal devices 100 that the users use. Then, the estimation unit 42 registers the estimation result in the estimation result database 32 (step S105).

The estimation unit 42, for example, extracts all of the pieces of position history information containing the terminal ID "ID101" indicating the terminal device 101 with reference to the position history database 31. Then, the estimation unit 42 specifies the places that the user using the terminal device 101 has visited based on the pieces of position information contained in the pieces of extracted position history information. The estimation unit 42 specifies, for example, the addresses, facility names, and the like of the places that the user has visited. Subsequently, the estimation unit 42 calculates the stay amounts which the terminal device 100 and the user have stayed at the specified places based on the collection time contained in the pieces of extracted position history information. The estimation unit 42 calculates, for the individual specified places, for example, at least one of the numbers of times that the terminal device 100 has been present, the lengths of periods of time during which the terminal device 100 has stayed, and the time bands in which the terminal device 100 has stayed. That is, the estimation unit 42 specifies the places that the users using terminal devices 100 have visited, and calculates as the stay amounts, at least one of the numbers of times that the users have visited the specified places, the stay periods of time therein, and the stay time bands therein.

Then, the estimation unit 42 estimates, based on the stay amounts, the bases corresponding to the terminal devices 100, that is, the bases as the houses in which the users using the terminal devices 100 live, the bases as companies in which the users work, or the like. That the estimation unit 42 estimates correspondence between the individual bases and the users based on what-is-called heat maps of the places that the users visit.

For example, when the user visits a fixed place during the day, the place or an area including the place is estimated to be the work place of the user. For example, when the user stays at a fixed place for a long period of time during the night, the place is estimated to be the house of the user. When the user is a full-time homemaker or the like, a place at which the user stays for the longest period of time is estimated to be the house of the user whereas when the user is a clerical worker or the like, a place at which the user stays for the longest period of time is estimated to be the work place of the user.

In the above-mentioned manner, a certain pattern is estimated to be generated when the user visits the base thereof such as the work place and the house. For this reason, the estimation unit 42 can calculate the stay amounts of the users (that is, the stay amounts of the terminal devices 100) based on the pieces of position history information to estimate who uses which base, that is, correspondence relations between the bases and the users.

The estimation unit 42 estimates the bases of the users based on the numbers of times that respective terminal devices 100 have stayed and the temporal amounts thereof. The estimation unit 42 can therefore estimate, the bases of the users, areas that the users visit many times or areas in which the users stay for a long period of time even when the pieces of position information acquired from the terminal devices 100 have some errors and the positions indicated by the pieces of position information are slightly different at every acquisition. Accordingly, the estimation unit 42 can estimate the bases of the users even when the pieces of position information acquired from the terminal devices 100 have some errors.

As illustrated in FIG. 1, the multiple dwelling housing M10 has the rooms R11 to R21 in which the users U01 to U04 live. In such a case, the pieces of position information that are collected from the terminal devices 101 to 104 are similar to one another. Accordingly, when the bases of tie users U01 to U04 are estimated from the pieces of position information, the multiple dwelling housing M10 can be estimated as the base but the rooms as the bases of the individual users U01 to U04 cannot be estimated in some cases.

In order to address the above-mentioned situation, the estimation unit 42 estimates the bases of the respective users U01 to U304 by estimating the correspondence between the terminal devices 101 to 104 and the bases based on the pieces of terminal device information about the respective terminal devices 100 and the pieces of communication device information about the communication devices communicating with the respective terminal devices 100, in addition to the pieces of position information.

In, for example, multiple dwelling housings such as apartments and condominiums, it is estimated that the communication devices for connection to a network such as the Internet are installed in the respective rooms and different SSIDs are assigned to the respective communication devices. Also in buildings and the like with a plurality of commercial facilities, the communication devices capable of being identified by the SSIDs that are different among the commercial facilities are installed in many cases.

It is considered, for example, that the wireless router installed in the room R21 and the wireless router installed in the room R11 use different SSIDs. When the correspondence between the SSIDS used by the communication device a the rooms in which the communication devices are installed can be specified, the pieces of information about the SSIDs used by the communication devices with which the terminal devices 100 can communicate can be indicators for specifying the rooms as the bases of the users in the multiple dwelling housing M10. When the room corresponding to at least one of the terminal devices 100 using the same SSID can be specified based on information by user registration in a certain service, or the like, all the terminal devices 100 using the same SSID can correspond to the room.

Global IP addresses that are different from one another when seen from the network N side are lent to the communication devices in some cases. In such a case, pairs of the IP addresses and port numbers lent to the communication devices are lent to the terminal devices 100 capable of communicating with the communication devices when seen from the network N side. The pieces of information about the IP addresses lent to the communication devices with which the terminal devices 100 can communicate can be indicators indicating the rooms in which the users are based in the multiple dwelling housing M10.

In the multiple dwelling housing M10 or the like, one IP address is lent to a communication device as a master unit that is connected to all of the communication devices installed in the respective rooms (that is, one global IP address is lent to the entire multiple dwelling housing M10) and the communication devices installed in the respective rooms can be specified with the port numbers from the network N side in some cases. In such a case, when the terminal devices 100 transmit the pieces of position information to the determination server 10 through the communication devices installed in the rooms, the determination server 10 can specify the communication devices through which the terminal devices 100 have transmitted the pieces of position information based on the IP address and the port numbers of the communication devices as the transmission sources. The pieces of information of the IP address and the port numbers lent to the communication devices with which the terminal devices 100 can communicate can be indicators indicating the rooms in which the users are based in the multiple dwelling housing M10.

The user makes selection, contract, and the like of an Internet service provider (ISP) (hereinafter, referred to as a "provider") for each of the rooms (houses) including the case in which the communication device is installed in each of the rooms of the multiple dwelling housing in advance. The various pieces of information about the communication devices, such as the SSIDs, the IP addresses, and the port numbers that the communication devices use and the providers that are used for connection of the communication devices to the network N can be indicators for specifying the rooms in which the users of the terminal devices 100 capable of communicating with the communication devices are based by reception of provision of pieces of information about contract addresses containing the room numbers in the multiple dwelling housing from systems of the providers.

Users working in the same company receive the terminal devices 100 provided by the company in some cases. In such a case, the terminal devices 100 provided by the company are of a common model in many cases. It is estimated that the terminal devices 100 provided by different companies are of different models. For example, when a plurality of companies are settled in the same building, the model types of the terminal devices 100 that the users use can therefore be indicators for estimating companies where the users work, that is, companies as the bases of the users.

Furthermore, the versions and the model numbers of the OSs, the browsers, and the applications that the terminal devices 100 execute are different among the models of the terminal devices 100 in so e cases. The model numbers of the terminal devices 100 and the versions and the model numbers of the OSs, the browsers, the applications, and the like that the terminal devices 100 execute can therefore be indicators for specifying users based in the same work place. The users based in the same home or the same company use the mobile communication network service that is provided by the same carrier with a high probability.

The collection unit 41 collects, as the pieces of communication device information, not only the SSIDs of the communication devices but also the IP addresses and the port numbers of the communication devices, the piece information of the providers, and the like. The collection unit 41 collects, as the pieces of terminal device information, the versions and the model numbers of the OSs, the browsers, the applications, and the like, and the carriers of the respective terminal devices 100. The estimation unit 42 estimates the bases corresponding to the terminal devices 100 among the bases located at the same place based on similarity, difference, and the like in the pieces of terminal device information and the pieces of communication device information in addition to the position histories.

The estimation unit 42 generates, for the individual bases, the pieces of estimation result information in which the base IDs, the pieces of position information indicating the places of the bases indicated by the base IDs, the terminal IDs of the terminal devices 100 that the users based in the places indicated by the pieces of position information use, and the user IDs of the users based in the places indicated by the pieces of position information correspond to one another. Then, the estimation unit 42 registers the pieces of generated estimation result information in the estimation result database 32.

For example, when the pieces of position information acquired from the terminal devices 101 to 104 indicate the position of the multiple dwelling housing M10 during the night, the estimation unit 42 estimates that the users U01 to U04 of the terminal devices 101 to 104 are based in the multiple dwelling housing M10. When the pieces of communication device information acquired from the terminal devices 101 and 102 are the same and the pieces of communication device information acquired from the terminal devices 103 and 104 are different from each other, the estimation unit 42 estimates that the users U01 and U02 of the terminal devices 101 and 102 are based in a common room and the users U03 and U04 of the terminal devices 103 and 104 are based in different rooms.

The IP addresses, the providers, and the like of the communication devices enable the rooms in which the communication devices are installed to be specified based on pieces of customer information that the providers have. For example, the values of the IP addresses lent to the respective communication devices, the pieces of customer information of customers using the respective communication devices, and the like are registered in customer information management servers with which the providers manage the pieces of customer information. The pieces of customer information contain the addresses and the user IDs of the users using the communication devices, the addresses containing the room numbers of the rooms in which the communication devices are installed, and the like.

The estimation unit 42 acquires the pieces of information that are managed by the customer information management servers of the providers contained in the pieces of communication device information, and specifies the rooms in which the communication devices capable of communicating with the terminal devices 100 are installed based on the pieces of communication device information received from the terminal devices 100. The collection unit 41 collects, for example, the IP addresses lent to the communication devices with which the terminal devices 100 can communicate together with the pieces of position information from the terminal devices 100. In another example, when the terminal devices 100 transmit the pieces of position information through the communication devices, the collection unit 41 collects the IP addresses and the port numbers indicating the transmission sources of the pieces of position information as the IP addresses and the port numbers of the communication devices with which the terminal devices 100 can communicate.

The estimation unit 42 notifies the customer information management servers of the IP addresses and the port numbers collected by the collection unit 41. In such a case, the customer information management servers specify the communication devices to which the notified IP addresses and port numbers are lent and specify the users using the specified communication devices and the rooms in which the specified communication devices are installed from the pieces of customer information. Then, the customer information management servers transmit the user IDS indicating the specified users and the room numbers indicating the specified rooms to the detect determination server 10. In such a case, the estimation unit 42 registers the received user IDs and room numbers in the estimation result database 32 in a corresponding manner.

The addresses of the users that are contained in the pieces of customer information can be considered to be the addresses of the bases of the users. The estimation unit 42 may therefore estimate the bases of the users using the terminal devices 100 from the pieces of customer information that the customer information management servers manage based on the user IDs received from the terminal devices 100. The estimation unit 42, for example, notifies the customer information management servers of the user IDs received from the terminal devices 100. In such a case, the customer information management servers specify the pieces of customer information of the users indicated by the notified user IDs, the pieces of information of the communication devices that the users use, and the like, and transmit the pieces of specified customer information and the pieces of specified information of the communication devices to the determination server 10. In such a case, the estimation unit 42 specifies the pieces of position information of the places as the bases of the users using the terminal devices 100, the room numbers thereof, and the like from the addresses of the users that are contained in the pieces of received customer information, and registers the pieces of specified position information and the specified room numbers in the estimation result database 32 so as to correspond to the user IDs.

For example, when the determination server 10 collects the communication device information containing the SSID of the communication device to which the terminal device 101 can be connected and the terminal information from the terminal device 101 that the user U01 uses, and estimates the base of the user U01 to be the room R21 based on the collected communication device information and the collected terminal information, it is considered that the determination server 10 estimates the correspondence between the SSID of the communication device and the room R21 as the base in which the communication device is installed. When the bases corresponding to the SSIDs contained in the pieces of collected communication device information have been already estimated, the estimation unit 42 may regard the estimated bases as the bases of the terminal devices 100 as the collection sources of the pieces of communication device information.

As a result, the estimation unit 42 can estimate the bases of the users U01 and U02 of the terminal devices 101 and 102 to be the room R21 in the multiple dwelling housing M10. The estimation unit 42 can estimate the base of the user U03 of the terminal device 103 to be the room R11 in the multiple dwelling housing M10 and the base of the user U04 of the terminal device 104 to be the room R12 in the multiple dwelling housing M10.

It should be noted that the estimation unit 42 may execute the processing of estimating the bases of the respective users using any method other than the above-mentioned processing. As described above, the pieces of information that are used for specifying the rooms in which the communication devices are installed, such as the pieces of communication device information containing the IP addresses, the port numbers, and the like lent to the respective communication devices, are different depending on routes through which the terminal devices 100 collect the pieces of communication device information from the communication devices, routes through which the determination server 10 receives the pieces of position information from the terminal devices 100, the connection configurations of the communication devices in the multiple dwelling housing M10, and the like.

The collection unit 41 may collect, as the pieces of communication information, not only the pieces of communication device information such as the SSIDs and the IP addresses of the communication devices but also various pieces of information that are used in communication with the terminal devices 100, such as pieces of desired acquirable information about routes through which the terminal devices 100 access the network N. In such a case, the pieces of communication device information are collected as a Dart of the pieces of communication information. The estimation unit 42 may estimate the bases in which the communication devices with which the terminal devices 100 can communicate are installed based on the pieces of collected communication information. Alternatively, the estimation unit 42 may select the pieces of information that are used for estimating the bases among the pieces of communication information based on the pieces of information indicating the routes through which the terminal devices 100 access the network N and estimate the bases based on the pieces of selected information.

The estimation unit 42 may estimate the bases of the users from the pieces of terminal information. For example, the pieces of company information such as the addresses of the companies as the provision sources of the terminal devices 100, the models of the terminal devices 100, types of pieces of software that are executed, and the like are registered in a corresponding manner in the management servers with which the carriers of the terminal devices 100 provided to the users by the companies or the like manage the pieces of customer information. The estimation unit 42 transmits the pieces of position information received from the terminal devices 100 and the pieces of terminal information received from the terminal devices 100 as queries to the management servers. The management servers transmit the pieces of company information corresponding to the pieces of position information and the pieces of terminal information received as the queries to the determination server 10, in such a case, the estimation unit 42 may register the pieces of received company information as the pieces of information indicating the bases of the users in the estimation result database 32

Subsequently, the determination unit 43 determines whether the users of the terminal devices 100 corresponding to the bases as visit destinations are present in the bases based on the estimation result by the estimation unit 42 (step S106). To be more specific, the determination unit 43 determines whether any of the users using the terminal devices 100 corresponding to each base as the visit destination, that is, each base specified as the delivery destination of the package is present in the base. When any of the users is determined to be present in the base, the determination unit 43 transmits the determination result to the delivery center server 50.

The determination unit 43, for example, receives the pieces of information of the bases as the delivery destinations from the delivery center server 50 or the like. In such a case, the determination unit 43 extracts the terminal IDs corresponding to the base IDs of the bases as the delivery destinations with reference to the estimation result database 32. The determination unit 43 searches the position history database 31 for the latest pieces of position information that have been acquired within a predetermined period of time among the pieces of position information received from the terminal devices 100 indicated by the extracted terminal IDs.

When the pieces of position information provided as a search result are identical to the positions of the bases contained in the estimation result database 32, the determination unit 43 determines that the users are present in the bases. On the other hand, when the pieces of position information cannot be provided Las the search result or when the pieces of position information provided as the search result are not identical to the positions of the bases contained in the estimation result database 32, the determination unit 43 determines that the users are not present in the bases. Then, the determination unit 43 transmits the determination result to the delivery center server 50 through the information provision unit 45.

In the example illustrated in FIG. 1, for example, the terminal device 101 of the user U01 and the terminal device 102 of the user U02 correspond to the room R21 as the base and the terminal device 104 of the user U04 corresponds to the room R12 as the base. In the example illustrated in FIG. 1, absence of the user U01 can be specified because the position information that is acquired from the terminal device 101 is not identical to the position information of the multiple dwelling housing M10. In the example illustrated in FIG. 1, presence of the user U02 in the base can be specified because the position formation that is acquired from the terminal device 102 is identical to the position information of the multiple dwelling housing M10 (or is located in the predetermined area).

In the case in which a package addressed to the user U01 is delivered, when the user U02 based in the room 21 is present in the room R21 even if the user U01 is absent therein, the package can be delivered by visiting the room R21. The determination unit 43 can therefore determine that a visitor can visit the room R21 as illustrated in FIG. 1(C) when either of the user U01 or U02 (for example, the user U02) based in the room R21 is present. In the example illustrated in FIG. 1, the user U04 based in the room R12 is absent in the room R12 as the base. As illustrated in FIG. 1(D), the determination unit 43 therefore determines that the visitor cannot visit the room R12.

In the above-mentioned manner, when the terminal devices correspond to one base as the delivery destination and any of the terminal devices is located at the same place as the base, it can be estimated that any of the users based in the place is present in the base. When at least one user is present in each base, the package can be delivered thereto. The determination unit 43 therefore determines that the package can be delivered when any of the users corresponding to each base as the delivery destination is present in the base.

Description is continued with reference to FIG. 6 again. The specifying unit 44 calculates the probabilities of presence of any of the users corresponding to respective bases for the each time band (step S107). Then, the specifying unit 44 specifies time bands with the probabilities of the presence of any of the users of the terminal devices 100 in the bases, in which the probabilities are higher than the predetermined threshold based on the stay histories of the terminal devices 100 in the corresponding bases. Thereafter, the specifying unit 44 registers the calculation result in the presence probability database 33 (step S108).

The specifying unit 44, for example, extracts he correspondence between the bases and the users from the estimation result database 32. The specifying unit 44 calculates probabilities of stay of the users corresponding to the extracted bases in the bases for each time band with reference to the position history database 31. For example, the specifying unit 44 calculates the probability of presence of the user U01 or the user U02 in the room R 1 between "10:00 and 11:00". Then, the specifying unit 44 registers the probabilities calculated for each time band as the pieces of presence probability information in the presence probability database 33.

Subsequently, the information provision unit 45 transmits, to the delivery center server 50, the determination result by the determination unit 43 together with the pieces of presence probability information specified by the specifying unit 44 (step S109). To be more specific, the information provision unit 45 transmits, to the delivery center server 50, together with the estimation result by the estimation unit 42, the pieces of presence probability information registered in the presence probability database 33.

The individual processors 41 to 45 can independently execute the pieces of processing at steps S101 to S108 in FIG. 6 in a divided manner at desired granularities. The collection unit 41 may execute the pieces of processing at steps S101 and S102, for example, at a predetermined time interval. The estimation unit 42 may execute the pieces of processing at steps S103 to S105, that is, the estimation processing at a predetermined time interval. The determination unit 43 may execute the processing at step S106, that is, the determination processing at a predetermined time interval or may execute it upon reception of a request from the delivery center server 50. The specifying unit 44 may execute the pieces of processing at steps S107 and S108, that is, the specifying processing at a predetermined time interval.

3. Pieces of Processing that Delivery Center Server 50 Executes in Embodiment

Hereinafter, examples of the functional configuration and action effects of the delivery center server 50 that executes, together with the above-mentioned generation processing, transmission processing of transmitting delivery information indicating delivery to the terminal devices 100 of the users as the delivery destinations of packages will be described with reference to the drawings.

3-1. Example of Functional Configuration

Figure 7:
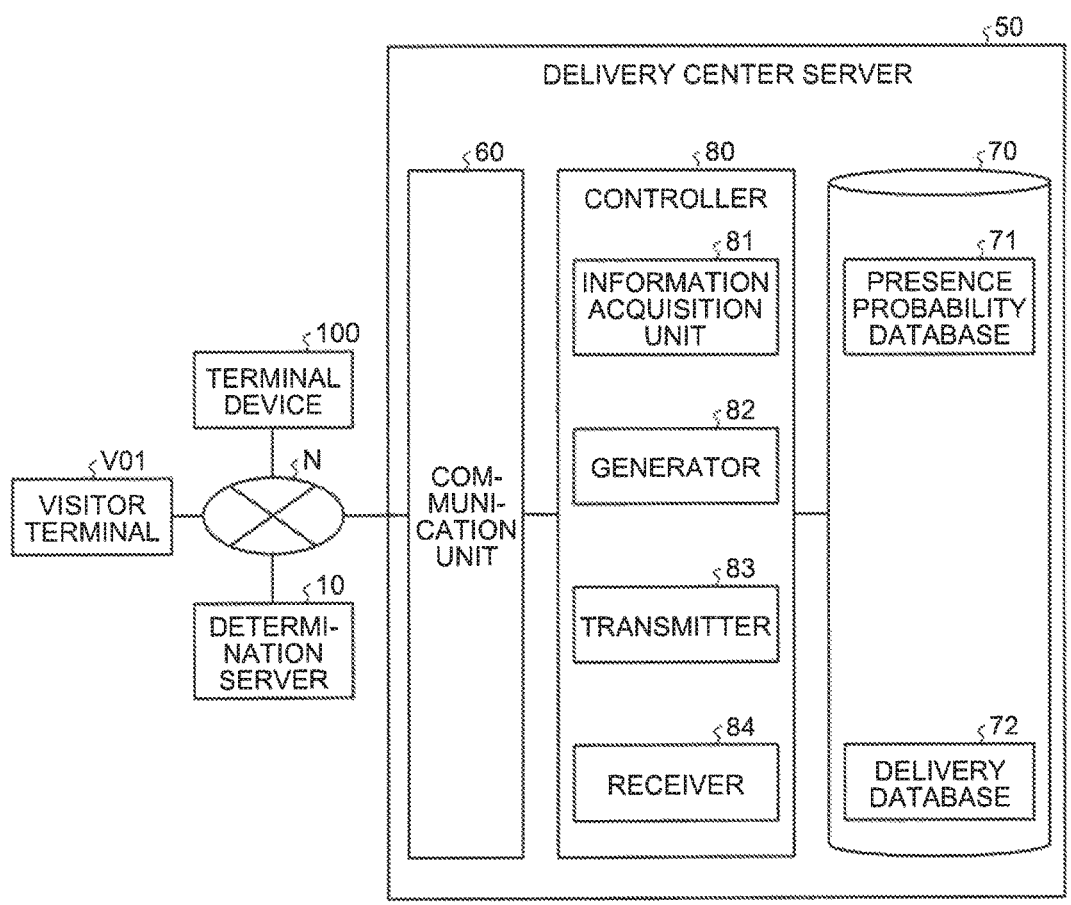
FIG. 7 is a diagram for explaining an example of the functional configuration of a delivery center server in the embodiment.

FIG. 7 is a diagram for explaining an example of the functional configuration of the delivery center server in the embodiment. As illustrated in FIG. 7, the delivery center server 50 includes a communication unit 60, a storage unit 70, and a controller 80. The communication unit 60 is implemented by, for example, an NIC, is connected to the network N by wire or wirelessly, and transmits and receives pieces of information between the delivery center server 50 and the determination server 10, terminal device 100, and the visitor terminal V01.

The storage unit 70 is implemented by, for example, a semiconductor memory element such as a RAM and a flash memory or a storage device such as a hard disk and an optical disk. The storage unit 70 includes a presence probability database 71 and a delivery database 72. Description of the presence probability database 71 is omitted, since the pieces of information registered in the presence probability database 71 are regarded as the same as those in the presence probability database 33 of the determination server 10.

Pieces of information indicating e bases as the delivery destinations of packages, that is, the bases as the visit destinations in the delivery service are registered in the delivery database 72. FIG. 8 is a diagram illustrating an example of the pieces of information that are registered in the delivery database in the embodiment. As illustrated in FIG. 8, the pieces of delivery information having items of a "deliverer ID", a "package ID", and a "delivery destination ID" are registered in the delivery database 72.

The "deliverer ID" is information for identifying a deliverer who delivers the package to the base and is, for example, an identifier of the visitor terminal V01 that the deliverer uses. The "package ID" is an identifier of the package that is delivered to the base. The "delivery destination ID" is a base ID of the base as the delivery destination, that is, the base as the visit destination.

In FIG. 8, for example, the delivery information in which a deliverer ID "V01", a package ID "package #1", and a delivery destination ID "base #1" correspond to one another is registered. This delivery information indicates, for example, that the deliverer indicated by the deliverer ID "V01", that is, the deliverer using the visitor terminal V01 delivers a package indicated by the package ID "package #1" to a base indicated by the delivery destination ID "base #1". Although the example in FIG. 8 illustrates conceptual values such as the "package #1", the embodiment is not limited thereto. It should be noted that pieces of delivery information having a desired item other than the pieces of information illustrated in FIG. 8 may be registered in the delivery database 72.

Description is continued with reference to FIG. 7 again. The controller 80 is implemented by, for example, causing a CPU, an MPU, an ASIC, an FPGA, or the like to execute various programs stored in the storage device in the delivery center server 50 using a storage region of the RAM or the like as a work region, in the example illustrated in FIG. 7, the controller 80 includes an information acquisition unit 81, a generator 82, a transmitter 83, and a receiver 84.

A connection relation among the individual processors 81 to 84 included in the controller 80 is not limited to the connection relation illustrated in FIG. 7 and may be another connection relation. The individual processors 81 to 84 implement and execute functions and actions (for example, FIG. 1) of the generation processing and the transmission processing, which will be described below, but these are functional units structured for description and may be unidentical to practical hardware components or software modules. That is, the delivery center server 50 may implement and execute the generation processing and the transmission processing, which will be described below, by any functional unit as long as it can implement and execute the functions and actions of the generation processing and the transmission processing.

3-2. Example of Action Effects in Generation Processing

Hereinafter, contents of the generation processing that the information acquisition unit 81 and the generator 82 execute and implement will be described with reference to a flowchart illustrated in FIG. 9. FIG. 9 is a flowchart for explaining an example of flow of the generation processing that the delivery center server in the embodiment executes.

First, the information acquisition unit 81 acquires the determination result and the pieces of presence probability information from the determination server 10 (step S201). Then, the information acquisition unit 81 registers the pieces of acquired presence probability information in the presence probability database 71 (step S202).

Subsequently, the generator 82 generates a delivery route indicating the order of visiting a plurality of bases as delivery destinations of packages based on the probabilities of the presence of the users in the bases as the delivery destinations of the packages (step S203). The generator 82, for example, specifies the bases corresponding to the visitor terminal V01, that is, the bases that the deliverer using the visitor terminal V01 visits with reference to the delivery database 72. Then, the generator 82 specifies the probabilities of the presence of the users in the bases specified from the delivery database 72 for each time band with reference to the presence probability database 71.

The generator 82 generates the delivery route for visiting the bases specified from the delivery database 72 based on the specified time bands. The generator 82, for example, estimates periods of time that are to be taken for transportation between the bases based on position relations between the bases, and generates the delivery route so as to make the probabilities of the presence of the users when the deliverer visits the respective bases be higher than the predetermined threshold in consideration with the estimated periods of time for transportation. Then, the generator 82 transmits the generated delivery route together with the determination result to the visitor terminal V01 (step S204) and displays the delivery route on the visitor terminal V01.

The generator 82 may, for example, display pieces of information indicating time bands in which the deliverer visit the individual bases together with the delivery route on the visitor terminal V01 and display the probabilities of the presence of the users in the bases for each time band. That is, the generator 82 may display any information on the visitor terminal V01 as long as the information can be provided as results of the estimation processing, the determination processing, and the specifying processing by the determination server 10.

The delivery center server 50 may notify the visitor terminal V01 of whether the users are present in the bases as the visit destinations, that is, whether the deliverer can visit the bases as the visit destinations even without generating the delivery route by transmitting the determination result by the determination server 10 as it is to the visitor terminal V01. The delivery center server 50 may transmit, together with the probabilities of the presence of the users in the individual bases, the pieces of information indicating the users receiving the packages are present or not in the individual bases, that is, the pieces of information for capabilities of visiting the individual bases, and the delivery center server 50 may display the information.

3-3. Example of Action Effects in Transmission Processing

Time and effort for redelivery are expected to be further reducible by transmitting visit notification to the users based in the places as the delivery destinations and the users present in the bases before the packages are delivered. The transmitter 83 and the receiver 84 execute the transmission processing illustrated in FIG. 10, thereby further reducing the time and effort for redelivery. Hereinafter, contents of the transmission processing that the transmitter 83 and the receiver 84 execute and implement will be described with reference to a flowchart illustrated in FIG. 10. FIG. 10 is a flowchart for explaining an example of flow of the transmission processing that the delivery center server executes in the embodiment.

For example, the transmitter 83 determines whether the current timing is a transmission timing of the visit notification (step S301). When the transmitter 83 determines that the current timing is not the transmission timing of the visit notification (No at step S301), the transmitter 83 stands by until the transmission timing of the visit notification. Then, when the transmitter 83 determines that the current timing is the transmission timing of the visit notification (Yes at step S301), the transmitter 83 transmits the visit notification (step S302).

For example, the transmitter 83 specifies the current position of the visitor terminal V01 and determines that the current timing is the transmission timing of the visit notification when the specified position makes close to a predetermined area from each base as the delivery destination. Then, the transmitter 83 transmits the visit information indicating that the visitor visits the base to the terminal device 100 of the user corresponding to the base.

For example, when the deliverer using the visitor terminal V01 visits the room R21, the transmitter 83 determines whether the current position of the visitor terminal V01 is within the predetermined area from the room R21. When the transmitter 83 determines that the current position of the visitor terminal V01 is within the predetermined area from the room R21, the transmitter 83 specifies the user U02 of the users U01 and U02 based in the room R21 to be present in the room R21 based on the determination result acquired from the deter nation server 10 and transmits the visit notification to the terminal device 102 that the specified user U02 uses. The transmitter 83 may transmit the visit notification to both of the terminal devices 101 and 102 that the users U01 and U02 based in the room R21 use, respectively.

The transmitter 83 may calculate a period of time until the visitor reaches each base based on a distance between the current place of the visitor terminal V01 and the base. When the calculated period of time becomes equal to or shorter than a predetermined period of time, the transmitter 83 may transmit the visit notification to the user corresponding to the base For example, when the period of time that is to be taken for transportation from the current place of the visitor terminal V01 to the room R21 becomes equal to or shorter than 10 minutes, the transmitter 83 may transmit the visit notification containing delivery of the package or a visit within 10 minutes to the terminal device 102.

For example, when the position indicated by the position information of the terminal device 102 corresponds to the position of the room R21 as the base as the delivery destination, the transmitter 83 may transmit the visit information to the terminal device 100 that the user uses. To be specific, the transmitter 83 may transmit the visit information to the terminal devices 100 based on the pieces of position information of the terminal devices 100 that the users corresponding to the bases as the delivery destinations use.

For example, even in the case in which the user U02 is not present in the room R21, when the user U02 cleans the outside of the room R21, goes out to the neighborhood, and so on, it is also considered that transmission of the visit notification enables the user U02 to receive the package. Furthermore, the pieces of position information measured by the terminal devices 100 have errors in some cases. In consideration with the errors, the transmitter 83 may transmit the visit notification when the current place of either of the terminal device 101 or 102 is located in the vicinity of the multiple dwelling housing M10 even in the case in which the current places of the terminal devices 101 and 102 that the users U01 and U02 use are away from the multiple dwelling housing M10. For example, when the current place of the terminal device 102 is located in an area within 5 minutes by walk from the multiple dwelling housing M10, the transmitter 83 may transmit the visit notification to the terminal device 102.

The receiver 84 determines whether it receives pieces of response information from the terminal devices 100 of the users based in the places as the delivery destinations (S303). When the receiver 84 does not receive the pieces of response information (No at step S303), the processing is finished. On the other hand, when the receiver 84 receives the pieces of response information (Yes at step S303), the receiver 84 notifies the visitor terminal V01 of the pieces of response information (step S304) and the processing is finished.

For example, when the terminal device 102 receives the visit notification from the transmitter 83, the terminal device 102 displays the information indicating the visit by the deliverer, and receives input of capability of the visit or a desirable time band for a revisit, that is, a time band in which the deliverer can visit. Then, the terminal device 102 transmits, to the delivery center server 50, the received input of the capability of the visit or the time band in which the deliverer can visit as the response information. In such a case, the receiver 84 transmits contents of the response information received from the terminal device 102 to the visitor terminal V01.

The delivery center server 50 may regenerate new route information based on the pieces of response information received by the receiver 84. For example, when the receiver 84 has received the response information indicating incapability of the visit or the time band in which the deliverer can visit from the terminal device 102 of the user U02, the generator 82 may regenerate route information causing the deliverer to visit the room R21 in the time band in which the deliverer can visit that is indicated by the response information and transmit the regenerated route information to the visitor terminal V01. As a result, the receiver 84 can prevent delivery failure that the deliverer visits the base regardless of the absence of the user and time and effort for the redelivery.

4. Modifications

The determination system 1 in the above-mentioned embodiment may be implemented in various different modes other than the above-mentioned embodiment. The following describes other embodiments of the above-mentioned determination system 1.

4-1. Specifications of Reception Facility

In recent years, package reception facilities such as lockers and posts are installed such that packages can be delivered even when users are absent in delivery destinations. When such reception facilities are installed, the packages can be delivered even in the case of absence of the users receiving the packages in the delivery destinations.

There are upper limits in the sizes and the numbers of packages capable of being received by the reception facilities due to the sizes of the lockers, the sizes of the post box slots, the number of lockers, and the like. The determination system 1 may decide capabilities of visits to the bases as the visit destinations based on, together with the determination result by the determination processing, the pieces of information about the package reception facilities at the bases as the visit destinations. The delivery center server 50, for example, previously stores therein presence and absence of the reception facilities corresponding to the respective bases as the visit destinations and the pieces of information about the reception facilities, such as the size, the numbers, the weights, and the like of the packages capable of being received by the respective reception facilities.

For example, when the user 304 is determined to be absent in the room R12 as the visit destination as a determination result of the determination processing, the delivery center server 50 determines whether the reception facility corresponding to the room R12 is present. When the reception facility corresponding to the room R12 is present, the delivery center server 50 may transmit, to the visitor terminal V01, an instruction to put the package addressed to the room R12 in the reception facility.

When the size of the package to be delivered is larger than the upper limit of the package capable of being received by the reception facility, the delivery center server 50 may transmit notification indicating that the deliverer cannot visit to the visitor terminal V01 When the number of packages capable of being received by the reception facility can be specified in real time, the delivery center server 50 may determine whether the reception facility can receive a new package and transmit notification to the visitor terminal V01 indicating whether the deliverer can visit based on the determination result.

4-2. Provision Mode of Determination System

In the above description, results of the estimation processing and the determination processing by the determination server 10 are provided to the delivery service of delivering the packages to the specified bases, as an example. The embodiment is however not limited thereto and the results of the above-mentioned estimation processing and determination processing can be provided to various types of services supposing presence of a user in a visit destination as long as a base of the user is estimated.

The results of the estimation processing and the determination processing executed by the determination system 1 can be used in, for example, various types of services involving a visit by a person while a user is present in a base, such as delivery of postal matters for which reception destinations are specified like registered mails, business activities, sales, interviews, inspection of various facilities, administrative services involving visits for various businesses, and a visiting care service.

4-3. Change of Base

In the above description, the determination server 10 estimates the correspondence between the bases and the users U01 to U04. The bases of the users U01 to U04 however vary among the time bands in some cases. For example, the bases of the users are companies during the day whereas the bases thereof are the houses during the night in some cases. For example, sole proprietors and the like have no base during the day whereas the bases thereof are companies during the evening and night in other cases. In consideration with these cases, the determination server 10 may estimate the bases of the users for each ti time band based on the time bands for which the pieces of position information are acquired.

The determination server 10, for example, estimates the work place or the like of the user U04 as the base of the user U04 in time bands during the day and estimates the room R12 as the base of the user U04 in time bands during the night. The determination server 10 may determine that no user based in the room R12 is present during the day. The delivery center server 50 may specify the base of the user U04 in a time band in which the deliverer visits and specify the specified base as the visit destination. The delivery center server 50 may determine that in the time bands during the day, the room R12 is not the base of the user U04 and that packages addressed to the room R12 cannot be delivered.

The delivery center server 50 may change the babes as the delivery destinations in accordance with types of packages. For example, when the package is an office supply, the delivery center server 50 may deliver the package to the place that is estimated to be the base during the day.

4-4. Usage of Results of Pieces of Processing

In the above-mentioned embodiment, the determination server 10 determines whether the users are present in the corresponding bases and the delivery center server 50 determines that packages can be delivered when the users are determined to be present in the corresponding bases. The embodiment is however not limited thereto.

The determination system 1 may provide various types of services by, for example, using absence of the users in the corresponding bases. As a specific example, the determination result by the determination system 1 may be used for, for example, an application of interrupting electrical systems in the corresponding bases for inspection when the users are determined to be absent in the corresponding bases. The determination result may be used for, for example, an application of intensively performing patrols by police officers, municipalities, and the like in time bands with low probabilities of the presence of the users in the corresponding bases.

In the above-mentioned example, the determination system 1 estimates the correspondence between the users U01 to U04 and the bases based on the pieces of position history information of the terminal devices 100 that the users U01 to U04 use. The embodiment is however not limited thereto. The determination system 1 may estimate, for example, correspondence between a movable information processing device h as a robot and a base based on the position history information of the robot. An estimation result and a determination result of the base of the robot can be used for, for example, indicators of determination whether the robot has returned to a charging place or a maintenance position, whether the robot is not stolen, and the like.

In the above-mentioned example, the determination system 1 determines that the package can be delivered when either of the user U01 or U02 based in the room R21 is present. The embodiment is however not limited thereto. For example, the determination system 1 may determine whether a predetermined user among users corresponding to a facility as a visit destination is present and determine that the deliverer can visit when the predetermined user is determined to be present.

For example, the determination system 1 specifies a user who is engaged in reception among users based in a company as a visit destination based on pieces of previously registered information and the like and determines whether the specified user is present. Then, the determination system 1 may determine that the deliverer can visit when the specified user is determined to be present. Execution of this processing enables the determination system 1 to deliver a package to a predetermined user at reception or the like even when an addressed user is absent in the base.

4-5. Specification of User

The determination server 10 may specify users using the terminal devices 100 by any method. For example, the determination s 10 may receive advance registration indicating that the user using the terminal device 101 is the user U01, and, for example, may acquire information about the user U01 from the carrier of the terminal device 101. The determination server 10 may acquire information that the user U01 uses for log-in, registration authentication information that the user U01 has registered in advance, or the like from an auction site or the like when the user U01 logs in the auction site or the like using the terminal device 101. The determination server 10 may acquire these pieces of information from a server device managing various pieces of information or may acquire these pieces of information from the terminal device 101.

The determination server 10, for example, may specify the users using the terminal devices 100 based on the pieces of identification information from the terminal devices 100. For example, the terminal devices 100 may store therein pieces of registration authentication information and the like input by the users when the users log in the auction site or the like, and transmit the pieces of stored registration authentication information together with the pieces of position information to the determination server 10 to notify the determination server 10 of the users using the terminal devices 100. That the determination server 10 may collect the terminal IDs, the user IDs, the pieces of terminal information, and the pieces of communication device information that are registered as the pieces of position history information by any method.

The determination server 10 is not required to specify the correspondence between all of the users and the terminal devices 100. For example, when the users present in the visit destinations may be different from recipients themselves of packages as in the package delivery service and the like, the determination server 10 may do without specifying the correspondence between the users and the terminal devices 100 and may specify only the correspondence between some users and the terminal devices 100. That is, the determination server 10 may determine whether the deliverer can visit the respective bases based on the presence or absence of the terminal devices 100 when only the correspondence between the terminal devices 100 and the bases of the users using the terminal devices 100, that is, only the correspondence between the terminal devices 100 and the bases can be estimated. With the processing, for example, the determination server 10 may do without specifying or registering the "user ID" in the estimation result database 32 illustrated in FIG. 4.

4-6. SSID

In the above description, the determination server 10 uses the pieces of position information that the terminal devices 100 acquire using the positioning means such as the GPS as the pieces of position history information. The embodiment is however not limited thereto. The determination server 10 may specify the positions of the terminal devices 100 using, for example, the pieces of communication device information such as the SSIDs. For example, the determination server 10 stores therein the SSIDs, the IP addresses, the MAC addresses, the port numbers, and the like set to the communication devices so as to correspond to the positions at which the communication devices are installed. When the determination server 10 receives the pieces of communication device information from the terminal devices 100, the determination server 10 may specify the positions corresponding to the pieces of communication device information and use the specified positions as the positions of the terminal devices 100.

4-7. Visit Notification

In the above description, the delivery center server 50 transmits the visit notification to the users corresponding to the bases as the visit destinations. The delivery center server 50 may transmit the visit notification to only users registered in advance. For example, the delivery center server 50 may transmit the visit notification to only the terminal device 102 of the user U02 when only the user U02 of the users U01 and U02 has performed registration in advance.

4-8. Determination Result

In the above description, the determination system 1 determines whether the users are present in the bases in real time based on the estimation result and calculates the probabilities of the presence of the users in the bases. It is sufficient that the determination system 1 only determines whether the users are present in the bases in real time based on the estimation result or only calculates the probabilities of the presence of the users in the bases. The delivery center server 50 need not notify the visitor terminal V01 of all of the probabilities of the presence of the users in the bases for each time band. The delivery center server 50 may notify the visitor terminal V01 of, for example, only time bands with the probabilities of the presence of the users in the bases, in which the probabilities are higher than the predetermined threshold. The delivery center server 50 may specify the time bands with the probabilities of the presence of the users in the bases, in which the probabilities are higher than the predetermined threshold for all of the bases as the visit destinations and generate the delivery route based on the specified time bands.

4-9. Other Embodiments

The above-mentioned embodiment is merely an example and the present invention encompasses the following exemplifications and other embodiments. The functional configurations, the data structures, the orders and contents of the pieces of processing illustrated in the flowcharts, and the like in the present application are merely examples, and presence and absence of the components, arrangement manners thereof, the order and specific contents of the pieces of processing that they execute, and the like can be appropriately changed. Instead of the configuration which the determination server 10 and the delivery center server 50 implement the above-mentioned various pieces of processing as in the above-mentioned embodiment, the pieces of processing can be implemented as devices, methods, and programs in terminals which applications or the like of smart phones implement. Furthermore, one server device, one cloud system, or the like may implement the functions and the functional configurations that the determination server 10 and the delivery center server 50 execute.

The configuration in which the individual processors 41 to 45 configuring the determination server 10 are implemented by independent devices is also employed commonly, and the configuration in which the individual processors 81 to 84 configuring the delivery center server 50 are implemented by independent devices is also employed commonly. In the same manner, the configuration of the present invention can be flexibly changed as follows. That is, for example, the pieces of processing described in the above-mentioned embodiment are implemented by calling an external platform or the like using an application program interface (API) or network computing (what-is-called cloud or the like). Furthermore, the individual elements according to the present invention are not limited to be implemented by operation controllers of computers and may be implemented by other information processing mechanisms such as physical electronic circuits.

5. Effects

As described above, the determination server 10 estimates the correspondence between the terminal devices 100 and the bases based on the pieces of position history information as histories of the pieces of position information indicating the positions of the terminal devices 100. Furthermore, the determination server 10 determines whether the users of the terminal devices 100 corresponding to the bases as the visit destinations are present in the bases based on the estimation result.

Thus, the determination server 10 can link the bases and the users to each other even when the correspondence between the terminal devices 100 or the users using the terminal devices 100 and the bases of the users are not registered in advance. As a result, the determination server 10 can easily determine whether the users are present in the bases as the visit destinations without advance registration. In addition, the determination server 10 prevents the delivery failure and reduces the number of times of revisit in various types of visit services, thereby improving profitability. The determination server 10 can set any place as the base as long as the base can be made to be linked with the user. This enables visit services such as the delivery service to be provided to, for example, users with no fixed address.

The determination server 10 estimates the bases corresponding to the terminal devices 100 based on the stay amounts of the terminal devices 100 at the respective positions indicated by the pieces of position history information. The determination server 10 estimates the bases corresponding to the terminal devices 100 based on, for example, at least one of the numbers of times that the terminal devices 100 have stayed, the lengths of the periods of time during which the terminal devices 100 have stayed and the time bands in which the terminal devices 100 have stayed as the stay amounts of the terminal devices 100.

The determination server 10 can therefore specify the places in which the users of the terminal devices 100 are really based. The determination server 10 can, for example, increase reliability that the places are the bases of the users as the periods of time during which the users have stayed are longer. When these pieces of processing are executed, the users who have stayed at the visit destinations for a long period of time, that is, the users really based in the visit destinations can be estimated. As a result, the determination server 10, for example, can prevent occurrence of the case in which a package is delivered to a user who pretends to be based in a visit destination while stealing into the visit destination, waiting at an entrance of the visit destination, and so on although the user is not based in the visit destination.

The determination server 10 estimates the bases corresponding to the terminal devices 100 from the bases located at the same place based on the pieces of terminal device information about the terminal devices 100 in addition to the pieces of position history information The determination server 10 estimates the bases corresponding to the terminal devices 100 from the bases located at the same place based on the pieces of communication device information about the communication devices communicating with the terminal devices 100 at the bases in addition to the pieces of position history information. The determination server 10 can therefore estimate the correspondence between the oases located at the same place such as the rooms R11 to R21 in the multiple dwelling housing M10, and the individual users appropriately.

The determination server 10 determines whether any of the users using the terminal devices 100 corresponding to each base as the visit destination is present in the base When the determination server 10 determines that any of the users is present, it determines that the user is present in the base. With this determination, even when the addressed user himself (herself) is not present, the determination server 10 can determine whether the package can be delivered to the family or the like of the user.

The determination server 10 determines whether the users of the terminal devices 100 corresponding to the bases are present in the bases specified as e delivery destinations of the packages The determination server 10 can reduce the number of times of delivery failure and revisit in the delivery service based on the determination result.

The determination server 10 specifies the time bands with the probabilities of the presence of the users of the terminal devices 100 in the bases, in which the probabilities are higher than the predetermined threshold based on the stay histories of the terminal devices 100 the corresponding bases. The delivery center server 50 generates the route information indicating the route for visiting the individual bases based on the time bands specified for the bases as the visit destinations. The delivery center server 50 can therefore implement the delivery service efficiently based on the estimation The determination server 10 calculates the probabilities of the presence of the users in the bases as the visit destinations for each time band and displays the calculated probabilities on the visitor terminal V01 that the visitor uses. The determination server 10 can therefore provide indicators to the visitor for determining whether the visitor visits the bases.

The delivery center server 50 transmits the visit information indicating a visit by the visitor to the bases to the users corresponding to the bases. To be specific, the delivery center server 50 transmits the visit information to the terminal devices 100 corresponding to the bases specified as the visit destinations. For example, when the visitor makes close to the predetermined area from the bases, the delivery center server 50 transmits the visit information to the users corresponding to the bases. Alternatively, the delivery center server 50 transmits the visit information to the users corresponding to the bases when the period of time until the visitor reaches the bases become equal to or shorter than the predetermined ;period of time.

When the visit information is transmitted, the users in the vicinity of the bases can be notified of visits by the visitor to urge the users to return to the bases. The delivery center server 50 can therefore reduce the number of times of delivery failure and revisit.

The delivery center server 50 receives the capabilities of the visits or the pieces of response information indicating the time bands in which the visitor can visit from the users to which the visit information has been transmitted. The delivery center server 50 can therefore reduce the number of times of delivery failure and revisit.

The delivery center server 50 transmits the visit information to the terminal devices 100 based on the pieces of position information of the terminal devices 100 that the users corresponding to the bases use. For example, when the positions indicated by the pieces of position information of the terminal devices 100 correspond to the positions of the bases as the visit destinations, the delivery center server 50 transmits the visit information to the terminal devices 100. The delivery center server 50 can therefore urge the users in the vicinity of the bases to return to the bases, thereby reducing the number of times of delivery failure and revisit.

The determination system 1 decides the capabilities of visits to the bases as the delivery destinations based on the determination result and the pieces of information about the reception facilities for packages that are delivered to the bases as the visit destinations. In this manner, the determination system 1 decides the capabilities of the visits to the visit destinations based on the pieces of information about the reception facilities of the packages addressed to the bases, such as the lockers and the posts, thereby reducing the number of times of delivery failure and revisit.

Although some embodiments of tie present application have been described in detail with reference to the drawings, these are examples and the present invention can be implemented in modes described in the disclosure of the invention and in other modes with various modifications or improvements based on the knowledge of those skilled in the art.

Furthermore, the above-mentioned "sections, modules, and units" can be read as "means", "circuits" or the like. For example, a determination unit can be read as a determination means or a determination circuit.

The embodiment above can be applied not only to a determination device, a determination method, and a non-transitory computer readable storage medium but also to a determination device through a clustering analysis of position history data. The determination device through a clustering analysis of position history data incudes an estimation unit (corresponding to estimation unit 42) that, by conducting a clustering analysis on history data of pieces of geographical position information on Earth of a plurality of movable bodies that is obtained by a positioning device, based on a horizontal position constituted of a latitude and a longitude and a lapse of time, acquires pieces of area information indicating a characteristic of geographical area in which there is a tendency for the movable bodies to be positioned, by controlling an electronic information processing unit, the history data being accumulated sequentially in a storage device with pieces of movable body identification information and pieces of timestamp information. The determination device through a clustering analysis of position history data includes a determination unit (corresponding to determination unit 43) that determines whether the movable body is present in a specified point in time and the geographical area, based on the pieces of area information acquired for one of the movable bodies, by controlling an electronic information processing unit.

The determination device through a clustering analysis of position history data can be applied not only to the field of delivery but also to other fields such as an animal management and traffic control of aircraft and spacecraft. "A determination device comprising: an estimation unit that estimates correspondence between a terminal device and a base from history of pieces of position information indicating positions of the terminal device; and a determination unit that determines whether a user of the terminal device corresponding to the base as a visit destination is present in the base based on an estimation result by the estimation unit" can be performed alone without requiring a configuration "a determination device through a clustering analysis of position history data comprising: an estimation unit that, by conducting a clustering analysis on history data of pieces of geographical position information on Earth of a plurality of movable bodies that is obtained by a positioning device, based on a horizontal position constituted of a latitude and a longitude and a lapse of time, acquires pieces of area information indicating a characteristic of geographical area in which there is a tendency for the movable bodies to be positioned, by controlling an electronic information processing unit, the history data being accumulated sequentially in a storage device with pieces of movable body identification information and pieces of timestamp information; and a determination unit that determines whether the movable body is present in a specified point in time and the geographical area, based on the pieces of area information acquired for one of the movable bodies, by controlling an electronic information processing unit".

According to an aspect of the embodiment, absence of a user can be easily determined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A determination device through a clustering analysis of position history data comprising:
    an estimation unit that, by conducting a clustering analysis on history data of pieces of geographical position information on Earth of a plurality of movable bodies that is obtained by a positioning device, based on a horizontal position constituted of a latitude and a longitude and a lapse of time, acquires pieces of area information indicating a characteristic of geographical area in which there is a tendency for the movable bodies to be positioned, by controlling an electronic information processing unit, the history data being accumulated sequentially in a storage device with pieces of movable body identification information and pieces of timestamp information; and
    a determination unit that determines whether the movable body is present in a specified point in time and the geographical area, based on the pieces of area information acquired for one of the movable bodies, by controlling an electronic information processing unit, wherein the estimation unit and the determination unit are implemented by one or more processors.

2. The determination device according to claim 1, wherein the one or more processors control movement of at least one of the movable bodies based on a determination result by the determination unit with reference to at least one of a direction in which the movable body comes closer to another movable body and a direction in which the movable body comes away from the other movable body.

3. The determination device according to claim 1, wherein
the estimation unit estimates correspondence between a terminal device and a base from history of pieces of position information indicating positions of the terminal device; and
the determination unit determines whether a user of the terminal device corresponding to the base as a visit destination is present in the base based on an estimation result by the estimation unit.

4. The determination device according to claim 3, wherein the estimation unit estimates the base corresponding to the terminal device based on amounts for which the terminal device has stayed at the respective positions indicated by the history of the pieces of position information.

5. The determination device according to claim 4, wherein the estimation unit estimates the base corresponding to the terminal device based on at least one of numbers of times that the terminal device has stayed, lengths of periods of time during which the terminal device has stayed, and time bands in which the terminal device has stayed as the amounts for which the terminal device has stayed.

6. The determination device according to claim 3, wherein the estimation unit estimates the base corresponding to the terminal device from a plurality of bases located at the same place based on information about the terminal device in addition to the history of the pieces of position information.

7. The determination device according to claim 3, wherein the estimation unit estimates the base corresponding to the terminal device from a plurality of bases located at the same place based on information about a communication device communicating with the terminal device at the base in addition to the history of the pieces of position information.

8. The determination device according to claim 3, wherein the determination unit determines whether any of a plurality of users using terminal devices corresponding to the base as the visit destination is present and determines that the user is present in the base when it is determined that any of the users is present.

9. The determination device according to claim 3, wherein the determination unit determines whether the user of the terminal device corresponding to the base specified as a delivery destination of a package is present in the base.

10. The determination device according to claim 3, further comprising a specifying unit that specifies a time band with a probability of presence of the user of the terminal device in the corresponding base that is higher than a predetermined threshold based on a history that the terminal device has stayed in the base.

11. The determination device according to claim 10, further comprising a generator that generates route information indicating a route for visiting a plurality of bases as visit destinations based on time bands specified by the specifying unit for the bases.

12. The determination device according to claim 10, wherein the specifying unit calculates probabilities of the presence of the user in the base as the visit destination for respective time bands and displays the calculated probabilities on a visitor terminal that a visitor uses.

13. The determination device ice according to claim 3, further comprising a transmitter that transmits visit information indicating a visit of a predetermined visitor to the base to the user corresponding to the base.

14. The determination device according to according to claim 13, wherein the transmitter transmits the visit information to the user corresponding to the base when the visitor comes close to a predetermined area of the base.

15. The determination device according to claim 13, wherein the transmitter transmits the visit information to the user corresponding to the base when a period of time until the visitor reaches the base becomes equal to or shorter than a predetermined period of time.

16. The determination device according to claim 13, further comprising a receiver that receives response information indicating capability of the visit or a time band in which the visitor is capable of visiting from the user to which the transmitter has transmitted the visit information.

17. The determination device according to claim 13, wherein the transmitter transmits the visit information based on the position information of the terminal device that the user corresponding to the base uses to the terminal device.

18. The determination device according to claim 17, wherein the transmitter transmits the visit information to the user when a position indicated by the position information corresponds to a position of the base as the visit destination.

19. The determination device according to claim 13, wherein the transmitter transmits the visit information to the terminal device corresponding to the base specified as the visit destination.

20. The determination device according to claim 3, further comprising a decision unit that decides capability of a visit to the base as the visit destination based on a determination result by the determination unit and information about a reception facility of a package to be delivered to the base as the visit destination.

* * * * *